No. 876,641. PATENTED JAN. 14, 1908.
H. S. HATFIELD.
VOLTAMETER.
APPLICATION FILED OCT. 14, 1907.
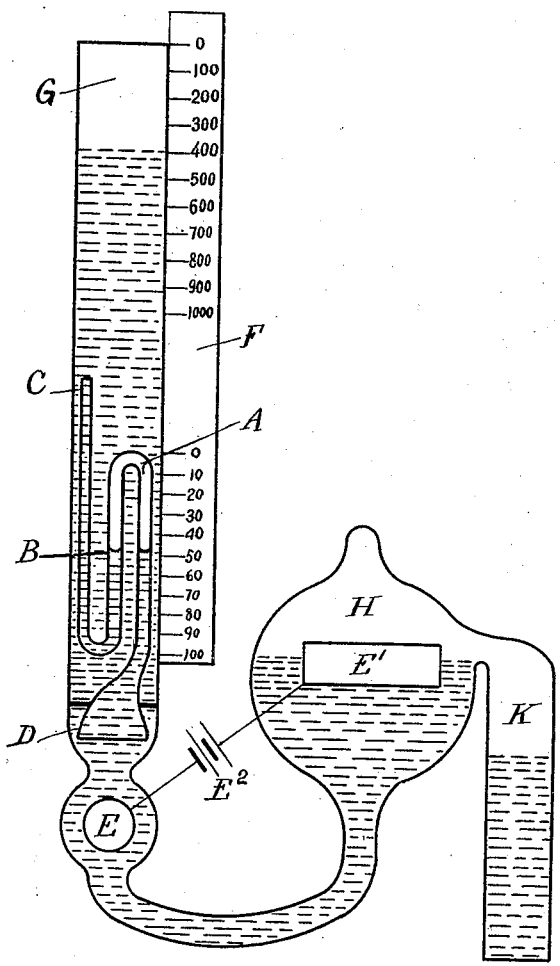
Witnesses
Inventor
Henry S Hatfield
By his Attorneys

UNITED STATES PATENT OFFICE.

HENRY STAFFORD HATFIELD, OF HOVE, ENGLAND.

VOLTAMETER.

No. 876,641.  Specification of Letters Patent.  Patented Jan. 14, 1908.

Application filed October 14, 1907. Serial No. 397,342.

*To all whom it may concern:*

Be it known that I, HENRY STAFFORD HATFIELD, a subject of the King of Great Britain and Ireland, residing at 18 Palmeira Square, Hove, in the county of Sussex, England, have invented new and useful Improvements in Voltameters, of which the following is a specification.

This invention relates to improvements in gas measuring apparatus in which it is desired to measure at any time the amount of continuously accumulating gas as in an electric gas voltameter.

It consists in providing that the gas to be collected shall pass into a tube bent twice upon itself to form three parallel limbs and placed vertically or at a suitable angle with the horizontal in a vessel of liquid. The gas is caused to enter the lower open end of the tube which may broaden out into a funnel for collecting it and the gas accumulates in this and the next limb of the tube. When sufficient to fill the two limbs has accumulated, the gas will pass as a whole out at the upper open end of the third limb which should be of smaller diameter than the first and longer than the second. That is to say, there is a self-emptying action, by which a given volume of gas is automatically expelled from the bent tube at each operation.

The tube is of some transparent material such as glass and is graduated in divisions of equal volume. A second tube is provided into which the gas is arranged to pass on leaving the first and this also is graduated. The total volume of gas which has accumulated is then read off by the sum of the volumes which is in the two tubes.

This invention is especially applicable to sealed electric gas voltameters which have hitherto been constructed with single measuring tubes. By means of my invention a much longer scale can be obtained without unduly increasing the size of the instrument.

In the accompanying drawing a sealed electric gas voltameter is represented fitted with a measuring tube constructed according to my invention.

A, B, C is the three-limbed measuring tube having a downwardly extending U branch, composed of the limbs A, B, in both of which limbs the gas given off from the electrolyte at the electrode E simultaneously accumulates, being collected by the funnel D. Against the lower part of the scale F the volume collected can be read until the mark "100" is reached when the gas escapes by the limb C and registers against the "100" mark on the upper scale. The total volume of gas collected is thus read by adding the readings of the two scales. In the drawing the reading would be about 450. In order to prevent the point of emptying of the tube being altered with temperature the level of the liquid in the bulb "H" is maintained at a constant level (viz. that of the "100" mark on the lower scale) by the overflow tube "K" being provided into which the liquid overflows as it is displaced by the accumulation of gas in the measuring tubes. The source of current is indicated at $E^2$ and the electrodes at E, E'.

It is evident that the measuring tube might be variously shaped for particular purposes while preserving the property of self-emptying.

In the construction of electric voltameters according to this invention the following application of the well known laws of gases must be taken into account. Gas in the space "G" is at a lower pressure than the gas in the space "H" by the difference in level between the level surface in "G" and in "H." As the pressures of the gas in the two spaces are increased by an equal fraction for equal changes of temperature, the difference in pressure that is the difference in level tends also to increase by the same fraction with increase of temperature. It is therefore clear that the graduations of the upper scale must be sufficiently wide apart that no change of temperature met with in practice shall introduce a sufficient change of level in the liquid to cause uncertainty in the reading. Since the effect produced by change of temperature on the change of level is proportionate to the difference in level, the height of the tube "G" should not be unduly increased.

With regard to the error produced by temperature on the reading of the lower bent tube as stated above it is minimized as follows. If the level of the liquid surface in the bent tube at the moment of emptying which I call the empting level be the same as that of the free surface of the liquid in "H" the pressure of the gas in the bent tube will then be the same as the pressure of the gas in "H" and no change in temperature of the instrument as a whole will cause any difference of pressure between them. The emptying of the tube will then occur always with a fixed amount of gas whereas it is clear that if the levels were not the same this would not be the case. For example supposing that the level of the 100 mark on the lower scale were much above the level of the liquid in "H" then if the level of the liquid surface in the bent tube were at 98 by a sufficient decrease of temperature it might come to the 100 mark and the tube might empty itself by the action of temperature alone. It is clear then that in a voltameter constructed according to my invention in which the bent tube is not unduly long only a very small error due to temperature is made caused by the slight change in the level of the liquid surface in the bent tube with temperature. The function of the overflow tube "K" is as stated to maintain the level in "H" constant.

Having thus described my invention what I claim as new and desire to secure by Letters Patent is.

1. An electric gas voltameter comprising a sealed and calibrated tube containing an electrolyte and an electrode from which gas is given off, and a self-emptying, three-limbed calibrated tube which collects the gas and which is contained within the sealed tube into which it periodically empties, substantially as described.

2. An electric gas voltameter comprising a sealed and calibrated tube containing an electrolyte and an electrode from which gas is given off, and a self-emptying, three-limbed tube for the gas having a collecting funnel contained within the sealed tube into which it periodically empties, substantially as described.

3. An electric gas voltameter comprising a self-emptying, three-limbed calibrated tube, and a sealed and calibrated tube into which the three-limbed tube periodically empties, the emptying level of the three-limbed tube being approximately the same as the level of the free surface of the liquid in the sealed tube, substantially as described.

4. An electric gas voltameter comprising a sealed and calibrated tube having a bulb and an overflow tube to maintain constant the liquid level in the bulb, and a self-emptying, three-limbed calibrated tube contained within the sealed tube, substantially as described.

5. An electric gas voltameter comprising a sealed tube containing an electrolyte and an electrode from which gas is given off, and a self-emptying three-limbed calibrated tube having a downwardly extending U branch in both limbs of which the gas simultaneously accumulates and which is connected with the sealed tube into which it periodically empties, substantially as described.

In witness whereof I have signed my name to this specification in the presence of two subscribing witnesses.

H. STAFFORD HATFIELD.

Witnesses:
H. W. JAMESON,
TH. RAND.